United States Patent
Tadaki

(10) Patent No.: US 9,462,820 B2
(45) Date of Patent: Oct. 11, 2016

(54) ACIDIC EMULSIFIED LIQUID SEASONING CONTAINING SESAME

(75) Inventor: Asami Tadaki, Settsu (JP)

(73) Assignee: Kewpie Corporation, Tokyo-To (JP)

(*) Notice: Subject to any disclaimer, the term of this patent is extended or adjusted under 35 U.S.C. 154(b) by 221 days.

(21) Appl. No.: 13/375,312

(22) PCT Filed: Nov. 24, 2010

(86) PCT No.: PCT/JP2010/070893
§ 371 (c)(1),
(2), (4) Date: Feb. 14, 2012

(87) PCT Pub. No.: WO2011/065364
PCT Pub. Date: Jun. 3, 2011

(65) Prior Publication Data
US 2012/0135126 A1    May 31, 2012

(30) Foreign Application Priority Data

Nov. 27, 2009  (JP) ................................. 2009-270266
Nov. 27, 2009  (JP) ................................. 2009-270300

(51) Int. Cl.
*A23L 1/24* (2006.01)
*A23L 1/05* (2006.01)
*A23L 1/36* (2006.01)

(52) U.S. Cl.
CPC .. *A23L 1/24* (2013.01); *A23L 1/05* (2013.01); *A23L 1/366* (2013.01)

(58) Field of Classification Search
CPC ............ A23L 1/24; A23L 1/05; A23L 1/366
See application file for complete search history.

(56) References Cited

U.S. PATENT DOCUMENTS

| | | | | |
|---|---|---|---|---|
| 4,034,124 | A * | 7/1977 | van Dam | 426/602 |
| 5,322,702 | A * | 6/1994 | Selinger et al. | 426/583 |
| 6,231,913 | B1 * | 5/2001 | Schwimmer et al. | 426/605 |
| 7,160,569 | B2 * | 1/2007 | Kudou et al. | 426/605 |
| 2005/0089621 | A1 * | 4/2005 | Aquino et al. | 426/601 |

FOREIGN PATENT DOCUMENTS

| | | |
|---|---|---|
| JP | 06-133728 | 5/1994 |
| JP | 2002-176953 | 6/2002 |
| JP | 2003-304828 | 10/2003 |

OTHER PUBLICATIONS

Machine translation of JP 06-133728. Published May 17, 2004 to Akida S, et al. pp. 1-14.*
"Herbs & Spices—Sesame seeds, white, hulled, toasted". Retrieved from www.savoryspiceshop.com, available online as of Feb. 17, 2007. p. 1.*
"Color Center—Color Handbook—Opacity". Retrieved online from www.specialchem4coatings.com, available online as of Aug. 28, 2007. pp. 1-5.*
"Diglyceride-Rich Foods May Promote Weight Loss". Retrieved online from bastyrcenter.org, available online as of Jun. 1, 2007). p. 1.*
Machine translation of JP 2003-304828 to Takeda et al. Publication date: Oct. 28, 2003. pp. 1-9.*
"Sesame" NPL. Available online from gernot-katzers-spice-pages.com as of Dec. 17, 1999. pp. 1-9.*
Matarese, Laura. "Nutrition and You: Fascinating, Fabulous Fiber" available online as of Aug. 6, 2015 from www.oley.org. pp. 1-2.*
US Sieve to Tyler Mesh Conversion. Available online as of Aug. 6, 2015 from www.carbidellc.com. p. 1.*
International Search Report from International Patent Application No. PCT/JP2010/070893, dated Feb. 10, 2011 (date of completion of report) and Feb. 22, 2011 (date of mailing of report). An English language translation is also enclosed.

* cited by examiner

*Primary Examiner* — Jenna A Watts
(74) *Attorney, Agent, or Firm* — Clark & Elbing LLP; Susan M. Michaud

(57) ABSTRACT

The present invention provides a sesame-containing acidic emulsified liquid seasoning capable of sufficiently giving a roasted sesame flavor even after storage. The sesame-containing acidic emulsified liquid seasoning according to the present invention comprises ground roasted sesame, gum substance, egg yolk and edible oil and has a viscosity of 0.1 to 5 Pa·s and a total light transmittance, which is determined by measuring the turbidity of the sesame-containing acidic emulsified liquid seasoning using integrating sphere-type electrophotometry, of 1.5 to 10%.

11 Claims, No Drawings

ACIDIC EMULSIFIED LIQUID SEASONING CONTAINING SESAME

CROSS-REFERENCE TO RELATED APPLICATIONS

This application is the U.S. national stage filing under 35 U.S.C. §371 of international application PCT/JP2010/070893, filed Nov. 24, 2010, which claims benefit of Japanese Patent Applications 2009-270266, filed Nov. 27, 2009, and 2009-270300, filed Nov. 27, 2009.

TECHNICAL FIELD

The present invention relates to a sesame-containing acidic emulsified liquid seasoning capable of sufficiently giving a roasted sesame flavor even after storage.

BACKGROUND ART

There are marketed sesame-flavored acidic emulsified liquid seasonings such as sesame dressings. Such sesame-flavored acidic emulsified liquid seasonings are characterized by being made into an emulsified liquid with an addition of ground sesame such as grated sesame and edible oil to an acidic seasoning liquid and have a distinctive flavor of sesame enhanced by the edible oil, which distinctive flavor of sesame is also made to provide a refreshing taste by the acidic seasoning liquid. Among them, those using roasted sesame are preferred and very popular because of their roasted sesame flavor. Such sesame-flavored acidic emulsified liquid seasonings are not only applied to salad dressings, but also used as sauces for tofu, meats and the like, and the trend in recent years is toward more frequent use of such seasonings at the table. With regard to such a sesame-flavored acidic emulsified liquid seasoning, a patent document such as JP 2003-304828A (Patent Document 1) discloses a method of producing a sesame-containing emulsified-type seasoning which contains ground sesame of a specific size and has a viscosity adjusted to a relatively high level.

However, conventional sesame-flavored acidic emulsified liquid seasonings have a problem in that the roasted sesame flavor is weak when tasted after storage; therefore, provision of an acidic emulsified liquid seasoning capable of sufficiently giving a roasted sesame flavor even after storage is demanded.

With regard to retention of sesame flavor, for example, in JP 2007-14252A (Patent Document 2), as a technique for maintaining flavor components of sesame flavor in an acidic seasoning over a prolonged period of time, a sesame flavor for acidic seasonings which is obtained by encapsulating sesame flavor components in a capsule formed by a film of specific materials is proposed. However, since this technique is for using sesame flavor and the flavor provided by the technique is, thus, inevitably slightly different from roasted sesame flavor, it is hardly said to be sufficiently satisfactory.

PRIOR ART DOCUMENTS

Patent Documents

Patent Document 1: JP 2003-304828A
Patent Document 2: JP 2007-14252A

SUMMARY OF THE INVENTION

Problem to be Solved by the Invention

Therefore, an object of the present invention is to provide a sesame-containing acidic emulsified liquid seasoning capable of sufficiently giving a roasted sesame flavor even after storage.

Means for Solving the Problem

In order to achieve the above-described object, the present inventor intensively studied to discover that, surprisingly, the grinding degree of the sesame dispersed in acidic emulsified liquid seasoning and the content of egg yolk emulsifying and dispersing edible oil influence the strength of the roasted sesame flavor after product storage. That is, the present inventor discovered that, as for the above-described ground sesame, the more turbid the emulsified seasoning becomes due to excessively ground fine matters, the weaker the roasted sesame flavor after product storage tends to become; and that, as for the egg yolk which emulsifies edible oil, when a large amount of egg yolk is used to emulsify and disperse edible oil, the emulsified seasoning becomes more turbid and in such a case, the roasted sesame flavor after product storage tends to become weak.

In view of the above, in addition to adjusting the grinding degree of the above-described ground sesame, the present inventor considerably reduced the content of the egg yolk emulsifying and dispersing the edible oil and used trace amounts of egg yolk and a specific thickener in combination to disperse the edible oil, thereby preparing a slightly transparent sesame-containing acidic emulsified liquid seasoning in which, as compared to conventional sesame-containing acidic emulsified liquid seasonings, the turbidity of the emulsified liquid seasoning as a whole is suppressed. As a result, the thus prepared emulsified liquid seasoning was confirmed to have a strong roasted sesame flavor after storage. Further, the present inventor also discovered that the turbidity of such a slightly transparent emulsified seasoning having a strong and preferable roasted sesame flavor after storage can be prescribed with a specific index representing the transparency, thereby finally completing the present invention.

That is, the present invention is as follows.
(1) A sesame-containing acidic emulsified liquid seasoning, which comprises ground roasted sesame, gum substance, egg yolk and edible oil and has a viscosity of 0.1 to 5 Pa·s and a total light transmittance of 1.5 to 10%, the total light transmittance being determined by measuring the turbidity of the sesame-containing acidic emulsified liquid seasoning using integrating sphere-type electrophotometry in accordance with the following procedure.
Procedure: the sesame-containing acidic emulsified liquid seasoning is poured into a 32-mesh sieve (Tyler standard) and allowed to free-fall therethrough, and the sesame-containing acidic emulsified liquid seasoning that passed through the sieve is then placed in a 5 mm-thick quartz cell to measure the total light transmittance thereof, taking pure water as a control.
(2) The sesame-containing acidic emulsified liquid seasoning according to (1), which has a content of the egg yolk in a product of 0.01 to 0.7% in terms of raw egg yolk.
(3) The sesame-containing acidic emulsified liquid seasoning according to (1) or (2), which has a content of the roasted sesame passing through a 14-mesh (Tyler standard) of not less than 50% and a content of the roasted sesame remaining on a 32-mesh (Tyler standard) of not less than 30%, with respect to the total amount of the roasted sesame contained in the product.

(4) The sesame-containing acidic emulsified liquid seasoning according to any one of (1) to (3), wherein the egg yolk is lyso-treated egg yolk.

Effects of the Invention

According to the present invention, a sesame-containing acidic emulsified liquid seasoning capable of sufficiently giving a roasted sesame flavor even after storage can be provided. Thus, the recent increase in the demand for sesame-containing acidic emulsified liquid seasoning can be complied and a further expansion in the demand for sesame-containing acidic emulsified liquid seasoning is expected.

MODE FOR CARRYING OUT THE INVENTION

The sesame-containing acidic emulsified liquid seasoning according to the present invention will now be described in detail. It is noted here that, in the present invention, "%" means "% by weight" and "parts" means "parts by weight".

The sesame-containing acidic emulsified liquid seasoning according to the present invention refers to a sesame-containing seasoning in which an edible oil is substantially uniformly dispersed as oil droplets in an aqueous phase having a pH of not more than 4.6 in the form of an oil-in-water type emulsion.

The above-described edible oil used in the present invention is not particularly restricted as long as it is one of a variety of edible oils that are conventionally used in an acidic emulsified liquid seasoning. Examples of the edible oil include animal and plant oils such as rapeseed oil, soybean oil, corn oil, safflower oil, sunflower oil, cotton seed oil, rice oil, palm oil, olive oil, peanut oil, beef tallow, lard and fish oil; purified oils thereof; and oils and fats obtained by performing a chemical treatment, enzyme treatment or the like, such as MCT (medium-chain triglyceride) and ester-exchanged oil, and one or more of these edible oils may be used in combination.

In the present invention, as the egg yolk, any egg yolk commonly used as an emulsifier in a conventional acidic emulsified liquid seasoning can be employed, and examples thereof include raw egg yolk obtained by breaking a chicken egg and separating from egg white; and such raw egg yolk subjected to one or more treatments, for example, sterilization treatment, freezing treatment, filtration treatment, drying treatment (e.g. spray drying, freeze-drying), enzyme treatment by phospholipase, protease or the like, desugaring treatment by yeast, glucose oxidase or the like, decholesterolization treatment (e.g. supercritical carbon dioxide treatment, subcritical carbon dioxide treatment) and/or mixing treatment with table salt or sugars. Further, as the egg yolk, for example, a whole egg obtained by breaking a chicken egg, a mixture obtained by mixing egg yolk and egg white at an arbitrary ratio, or such whole egg or mixture subjected to the above-described treatment(s) may also be employed. In a case where a whole egg or a mixture of egg yolk and egg white is employed in this manner, the egg yolk portion corresponds to the egg yolk of the present invention.

The lyso-treated egg yolk used in the present invention is one obtained by subjecting the above-described egg yolk to a lyso-treatment, and any of such lyso-treated egg yolks commonly used as an emulsifier in conventional acidic emulsified liquid seasonings can be employed. Here, the above-described "lyso-treatment" refers to a treatment in which phospholipid constituting egg-yolk lipoprotein (a complex between an egg-yolk lipid such as egg-yolk phospholipid, egg-yolk oil or cholesterol and an egg-yolk protein), which is the main component of an egg yolk, is hydrolyzed at the 1- or 2-position fatty-acid residue using phospholipase A1 or A2 into a lysophospholipid. As the hydrolysis degree of the fatty-acid residue in the lyso-treated egg yolk, the ratio of lysophosphatidylcholine with respect to the total amount of lysophosphatidylcholine and phosphatidylcholine (that is, lyso-ratio) is, when analyzed by the Iatroscan method (TLC-FID method), preferably 10 to 80%, more preferably 20 to 70%.

As the gum substance, any commercially-available gum substance used for food products can be employed. Examples thereof include guar gum, xanthan gum, tamarind seed gum, locust bean gum, gellan gum, gum arabic and psyllium seed gum, and one or more of these can be used in combination. Among these gum substances, guar gum, xanthan gum and tamarind seed gum are preferably used since they are not likely to impair the roasted sesame flavor and texture and make it easier to obtain a palatable sesame-containing acidic emulsified liquid seasoning having excellent roasted sesame flavor with good texture.

Further, the ground roasted sesame used in the present invention is obtained by grinding roasted sesame. The grinding method therefor is not particularly restricted and any sesame ground by a conventional method using a stone mill, colloid mill, food cutter, milder, roll crusher or the like may be used. As the above-described roasted sesame, any sesame roasted by a conventional method may be used, and specific examples thereof include those obtained by roasting sesame having outer seed coat in a direct fire-type roasting oven, far-infrared radiation-type roasting oven or the like. Examples of raw material sesame include those which are normally used to make roasted sesame, such as white sesame, gold sesame, black sesame and brown sesame. Among these, roasted sesame obtained by roasting white sesame or gold sesame without removing the outer seed coat is preferably used since such roasted sesame makes it easier to obtain a sesame-containing acidic emulsified liquid seasoning having a stronger roasted flavor after storage.

The sesame-containing acidic emulsified liquid seasoning according to the present invention is characterized by comprising the above-described ground roasted sesame, gum substance, egg yolk and edible oil and having a total light transmittance of 1.5 to 10%, preferably 2.0 to 10%, which total light transmittance is determined by measuring the turbidity of the sesame-containing acidic emulsified liquid seasoning using integrating sphere-type electrophotometry.

In the present invention, the total light transmittance of a sample obtained by measuring the turbidity thereof using integrating sphere-type electrophotometry is a value measured against the total light transmittance of pure water. That is, the total light transmittance is a transmittance obtained when the sample is irradiated with total light beam and represents the transmittance (%) of the sample, taking that of pure water, which is a control, as 100%. The measurement of the total light transmittance of a sample based on the turbidity measurement using integrating sphere-type electrophotometry is done by determining the total light transmittance of the sample from the ratio between the strength of the scattering light and that of the transmitted light which are obtained when particles are irradiated with light. The total light transmittance of the sample can be obtained in accordance with the following procedure using a turbidity measuring instrument (model "WA 2000N", manufactured by Nippon Denshoku Industries Co., Ltd.).

Procedure: sesame-containing acidic emulsified liquid seasoning is poured into a 32-mesh sieve (Tyler standard) and allowed to free-fall therethrough, and the sesame-containing acidic emulsified liquid seasoning that passed through the sieve is then placed in a 5 mm-thick quartz cell to measure the total light transmittance thereof, taking pure water as a control.

When, as described in the above, the total light transmittance of the sesame-containing acidic emulsified liquid seasoning according to the present invention is in a specific range of 1.5 to 10%, preferably 2.0 to 10%, it means that the turbidity of the acidic emulsified liquid seasoning according to the present invention is adjusted to an appropriately suppressed level, and the sesame-containing acidic emulsified liquid seasoning according to the present invention whose turbidity is adjusted to such a specific condition is capable of sufficiently giving a roasted sesame flavor even after storage. In contrast to this, when the total light transmittance is lower than the above-described range, the roasted sesame flavor after storage is weak and not preferable. On the other hand, when the total light transmittance is higher than the above-described range, since the content of the ground sesame or the like must be reduced, the roasted sesame flavor after storage tends to become weak.

In the present invention, in order to adjust the total light transmittance of the sesame-containing acidic emulsified liquid seasoning to the above-described range, it is required to adjust the size of the ground roasted sesame, as well as the content of the egg yolk emulsifying the edible oil.

That is, first, with regard to the size of the ground roasted sesame, when fine ground matters are dispersed in the emulsified liquid seasoning, the total light transmittance of the emulsified liquid seasoning is decreased to lower than 1.5%, and in this case, the roasted sesame flavor after product storage becomes weak. Therefore, in the present invention, by using roasted sesame which is not excessively ground and does not contain a large amount of fine ground matters, the total light transmittance of the emulsified liquid seasoning is adjusted to the above-described specific range.

From the standpoint of adjusting the total light transmittance of the emulsified liquid seasoning to the above-described specific range, the grinding degree of the roasted sesame used in the present invention is adjusted. First, when the roasted sesame is used without much grinding, it becomes difficult to impart good roasted sesame flavor to the emulsified liquid seasoning; therefore, in the present invention, the content of the roasted sesame passing through a 14-mesh (Tyler standard, aperture size of 1.19 mm) is preferably not less than 50%, more preferably not less than 60%, with respect to the total amount of the roasted sesame. On the other hand, when the roasted sesame is finely ground more than necessary, the emulsified seasoning becomes turbid and it becomes difficult for the total light transmittance thereof to satisfy the above-described range; therefore, in the present invention, the content of the roasted sesame remaining on a 32-mesh (Tyler standard, aperture size of 0.5 mm) is preferably not less than 30%, more preferably not less than 50%, with respect to the total amount of the roasted sesame contained in a product.

Here, the content of the roasted sesame passing through the above-described 14-mesh is a value obtained by subtracting the weight of the roasted sesame not passing through the 14-mesh sieve from the total amount of the roasted sesame. Further, the amount of the roasted sesame remaining on the above-described 32-mesh is a value obtained by measuring the weight of the roasted sesame not passing through the 32-mesh sieve.

Further, from the standpoint of the easiness to impart good roasted sesame flavor to the emulsified liquid seasoning, the content of the roasted sesame in a product is preferably not less than 3%, more preferably not less than 4%, with respect to the product. On the other hand, when the content of the roasted sesame is excessive, since the distinctive taste of sesame becomes too strong, it tends to be difficult to obtain a mild and palatable emulsified liquid seasoning; therefore, the content of the roasted sesame in the product is preferably not more than 35%, more preferably not more than 25%.

On another front, with regard to the egg yolk content, when a large amount of egg yolk is used to emulsify and disperse the edible oil, the total light transmittance of the emulsified liquid seasoning is decreased to lower than 1.5%, and in such a case, the roasted sesame flavor after product storage becomes weak. Therefore, in the present invention, by using trace amounts of the egg yolk and gum substance in combination to disperse the edible oil, the total light transmittance of the emulsified liquid seasoning is adjusted to the above-described specific range. It is noted here that use of a thickener such as starch without a gum substance is not preferred since it makes the roasted sesame flavor after product storage become weak.

Further, in the present invention, it is preferred to use lyso-treated egg yolk as the above-described egg yolk. In terms of the ratio of the lyso-treated egg yolk used as the egg yolk, it is preferred that not less than 30% of the egg yolk be lyso-treated egg yolk and it is more preferred that not less than 50% of the egg yolk be lyso-treated egg yolk. By this, when dispersing the edible oil in the emulsified liquid seasoning by using trace amounts of the egg yolk and gum substance in combination, it becomes easier to disperse the edible oil more stably and attain separation-inhibiting effect after a long-term storage.

From the standpoint of adjusting the total light transmittance of the emulsified liquid seasoning to the above-described specific range, the sesame-containing acidic emulsified liquid seasoning has an egg yolk content in the product of preferably 0.01 to 0.7%, more preferably 0.05 to 0.4%, in terms raw egg yolk. When the egg yolk content is more than the above-described range, the emulsified seasoning becomes turbid and it becomes difficult for the total light transmittance thereof to satisfy the above-described range. On the other hand, even when a gum substance is used in combination, if the egg yolk content is too small, the edible oil is hardly dispersed and the egg yolk flavor becomes subtle, so that it is difficult to obtain a delicious sesame-containing acidic emulsified liquid seasoning.

The weight ratio of the above-described egg yolk content and gum substance content is, in terms of the content ratio of the raw egg yolk and gum substance, 5 to 95:95 to 5, more preferably 10 to 90:90 to 10. When the content ratio of the egg yolk and gum substance is in the above-described range, it is easy to stably disperse the edible oil while adjusting the total light transmittance of the emulsified liquid seasoning to the above-described range. Further, the total amount of the above-described egg yolk (in terms of raw egg yolk) and gum substance is preferably 0.1 to 5 parts, more preferably 0.1 to 3 parts, with respect to 100 parts of the edible oil. When the total amount of the egg yolk and gum substance is less than the above-described range, it is difficult to stably disperse the edible oil, while when the total amount of the egg yolk and gum substance is more than the above-described range, the product viscosity becomes high and adjustment thereof to the below-described range becomes difficult, so that the roasted sesame flavor after product storage tends to become weak.

In addition to having the above-described total light transmittance in the above-described range, the sesame-containing acidic emulsified liquid seasoning according to the present invention has a product viscosity of 0.1 to 5 Pa·s, preferably 0.1 to 4 Pa·s. By having its viscosity in the above-described range, the sesame-containing acidic emulsified liquid seasoning according to the present invention is capable of sufficiently giving a roasted sesame flavor even after storage. In contrast to this, when the viscosity is more than the above-described range, the roasted sesame flavor after storage is felt weak and not preferable. On the other hand, when the viscosity is lower than the above-described range, since it becomes difficult to stably disperse the edible oil in the emulsified liquid seasoning, separation of the contents is likely to occur and the roasted sesame flavor tends to become weak. Although it depends on the edible oil content, the viscosity can be adjusted by changing the content of the above-described gum substance. Here, the above-described viscosity in the present invention is a value calculated based on the reading obtained on a BH-type viscometer when the rotor rotated twice after the start of the measurement, in which BH-type viscometer, under a condition where the product temperature is 20° C. and the rotation speed is 10 rpm, a rotor No. 1 is used when the viscosity is lower than 0.8 Pa·s, a rotor No. 2 is used when the viscosity is 0.8 Pa·s to lower than 3.2 Pa·s, and a rotor No. 3 is used when the viscosity is 3.2 Pa·s or higher.

The content of the edible oil in the sesame-containing acidic emulsified liquid seasoning according to the present invention is preferably 5 to 50%, more preferably 5 to 40%, still more preferably 5 to 35%. When the content of the edible oil is lower than the above-described range, it becomes difficult to obtain a sesame-containing acidic emulsified liquid seasoning having an appropriately enhanced distinctive flavor of sesame. On the other hand, when the content of the edible oil is more than the above-described range, the viscosity of the emulsified liquid seasoning tends to easily become high, so that it becomes difficult to adjust the viscosity to the above-described specific range.

Further, the acidulant used in the sesame-containing acidic emulsified liquid seasoning according to the present invention is not particularly restricted as long as it is one of a variety of acidulants that are conventionally used in an acidic emulsified liquid seasoning, and examples thereof include organic acids such as vinegar and citric acid and citrus juices such as lemon juice. By using these acidulants, the sesame-containing acidic emulsified liquid seasoning is allowed to have a refreshing taste.

In addition to the above-described edible oil, egg yolk, gum substance, ground roasted sesame and acidulant, the sesame-containing acidic emulsified liquid seasoning according to the present invention can also contain, in an amount which does not impair the effects of the present invention, a variety of appropriately selected raw materials that are normally used in an acidic emulsified liquid seasoning. Examples of such raw materials include saccharides such as degraded starch, dextrin alcohol, oligosaccharide and oligosaccharide alcohol; a variety of seasonings such as sodium glutamate, table salt, soy sauce, sugar, animal and plant extracts; species such as mustard powder and pepper; emulsifiers such as lecithin, lysolecithin, glycerin fatty acid ester, polyglycerin fatty acid ester, sucrose fatty acid ester, sorbitan fatty acid ester and octenylsuccinylated starch; antioxidants such as ascorbic acid and vitamin E; bacteriostatic agents; and cut food items such as layer and nuts.

The sesame-containing acidic emulsified liquid seasoning according to the present invention can be produced in accordance with a conventional production method of sesame-containing acidic emulsified liquid seasoning, except that the above-described raw materials for aqueous phase (e.g. egg yolk, acidulant, gum substance and seasoning) and the raw materials for oil phase (e.g. edible oil) are blended and the roasted sesame is further blended in the product in a ground condition; and that the total light transmittance and the viscosity of the emulsified liquid seasoning are adjusted to the above-described specific ranges. For example, the sesame-containing acidic emulsified liquid seasoning according to the present invention can be produced in the following manner: first the raw materials for aqueous phase are mixed to prepare an aqueous phase to which an edible oil (oil phase) is then added, and after emulsifying the resulting mixture, ground roasted sesame is added and further mixed or roasted sesame is added and ground with mixing. Further, alternatively, the sesame-containing acidic emulsified liquid seasoning according to the present invention can be produced also by adding ground roasted sesame to non-emulsified aqueous phase or oil phase and then performing emulsification of the resulting mixture, or by adding roasted sesame to non-emulsified aqueous phase or oil phase and then grinding the roasted sesame while performing emulsification. The sesame-containing acidic emulsified liquid seasoning obtained in the above-described manner can be filled into a covered container made of glass, polyethylene terephthalate (PET), polypropylene or the like or into a container such as a pouch to obtain a packaged product which can be stored for a prolonged period of time.

The present invention will now be further explained by way of examples, comparative examples and test examples.

EXAMPLES

In the following examples, the size of roasted sesame and the total light transmittance of sesame-containing acidic emulsified liquid seasoning were measured in the following manner.

(1) Method of Measuring the Size of the Roasted Sesame
(1-1) The Amount of the Roasted Sesame Passing Through a 14-Mesh with Respect to the Total Amount of the Roasted Sesame To sesame-containing acidic emulsified liquid seasoning, 10-fold amount of pure water was added to prepare a dispersion, which was then poured into a 14-mesh sieve (Tyler standard, aperture size of 0.5 mm) and allowed to free-fall therethrough. The residue remained on the sieve was dried by a heat drying method under reduced pressure and the weight of the thus dried residue was measured. Then, the thus measured weight of the roasted sesame not passing through the above-described 14-mesh sieve was subtracted from the total amount of the roasted sesame (the total amount of the roasted sesame used as raw material) to determine the amount of the roasted sesame passing through the 14-mesh. The ratio (%) of this amount of the roasted sesame passing through the 14-mesh with respect to the total amount of the roasted sesame (the total amount of the roasted sesame used as raw material) was determined.

(1-2) The Amount of the Roasted Sesame Remaining on a 32-Mesh with Respect to the Total Amount of the Roasted Sesame To sesame-containing acidic emulsified liquid seasoning, 10-fold amount of pure water was added to prepare a dispersion, which was then poured into a 32-mesh sieve (Tyler standard, aperture size of 1.18 mm) and allowed to free-fall therethrough. Then, the residue remained on the sieve was dried by a heat drying method under reduced pressure and the weight of the thus dried residue was measured to determine the amount of the roasted sesame remaining on the 32-mesh. The ratio (%) of this amount of the roasted sesame remaining on the 32-mesh with respect to the total amount of the roasted sesame (the total amount of the roasted sesame used as raw material) was determined.

(2) The Method of Measuring the Total Light Transmittance of Sesame-Containing Acidic Emulsified Liquid Seasoning The sesame-containing acidic emulsified liquid seasoning was poured into a 32-mesh sieve (Tyler standard, aperture size of 0.5 mm) and allowed to free-fall therethrough. The emulsified liquid seasoning that passed through the sieve was placed in a 5 mm-thick quartz cell to measure the total light transmittance using a turbidity measuring instrument (model "WA 2000N", manufactured by Nippon Denshoku Industries Co., Ltd.) and taking pure water as a control.

Example 1

In accordance with the blending ratio listed below, the sesame-containing acidic emulsified liquid seasoning according to the present invention was produced. That is, first, soy sauce, vinegar, sugar, raw egg yolk, lyso-treated egg yolk (lyso-ratio of 30%), guar gum, xanthan gum and pure water were loaded to a stirring tank and uniformly mixed to prepare an aqueous phase. Next, the thus obtained aqueous phase was loaded to a mixer and salad oil (oil phase) was added thereto by pouring with stirring. After emulsifying the resulting mixture, ground roasted sesame (prepared by grinding roasted white sesame having outer seed coat) was added and the resultant was further mixed to produce sesame-containing acidic emulsified liquid seasoning. The thus obtained sesame-containing acidic emulsified liquid seasoning was filled into PET containers with a lid in an amount of 250 mL each, and the containers were hermetically sealed to produce packaged sesame-containing acidic emulsified liquid seasoning. Here, when the size of the roasted sesame dispersed in the sesame-containing acidic emulsified liquid seasoning was measured, the content of the roasted sesame passing through the 14-mesh was 93% and that of the roasted sesame remaining on the 32-mesh was 76%, with respect to the total amount of the roasted sesame contained in the product.

The thus obtained sesame-containing acidic emulsified liquid seasoning had a total light transmittance of 3.1% and a viscosity of 0.6 Pa·s. Here, the weight ratio of the egg yolk content in terms of raw egg yolk and the gum substance content was 1:2, and the total content of the egg yolk in terms of raw egg yolk and the gum substance was 2 parts with respect to 100 parts of the edible oil.

After storage at room temperature (20° C.) for 2 weeks and 2 months, each of the thus obtained packaged sesame-containing acidic emulsified liquid seasoning was tasted. As a result, in either case, the roasted sesame flavor was very strong and preferable, and it was refreshing and delicious with distinctive flavor of sesame.

| <Blending ratio of the sesame-containing acidic emulsified liquid seasoning> | |
|---|---|
| Salad oil | 30% |
| Soy sauce | 5% |
| Vinegar (acidity 4%) | 15% |
| Sugar | 15% |
| Raw egg yolk | 0.1% |
| Lyso-treated egg yolk | 0.1% |
| Guar gum | 0.2% |
| Xanthan gum | 0.2% |
| Ground roasted sesame | 20% |
| Pure water | remaining amount |
| Total | 100% |

Example 2

In accordance with the blending ratio listed below, the sesame-containing acidic emulsified liquid seasoning according to the present invention was produced. That is, first, soy sauce, vinegar, sugar, lyso-treated egg yolk (the same as Example 1), guar gum, xanthan gum, ground roasted sesame (prepared by grinding roasted gold sesame having outer seed coat) and pure water were loaded to a stirring tank and uniformly mixed to prepare an aqueous phase, which was then loaded to a mixer. Next, salad oil (oil phase) was added thereto by pouring with stirring and the resulting mixture was emulsified to produce sesame-containing acidic emulsified liquid seasoning. The thus obtained sesame-containing acidic emulsified liquid seasoning was filled into PET containers with a lid in an amount of 250 mL each, and the containers were hermetically sealed to produce packaged sesame-containing acidic emulsified liquid seasoning. Here, when the size of the roasted sesame dispersed in the sesame-containing acidic emulsified liquid seasoning was measured, the content of the roasted sesame passing through the 14-mesh was 73% and that of the roasted sesame remaining on the 32-mesh was 63%, with respect to the total amount of the roasted sesame contained in the product.

The thus obtained sesame-containing acidic emulsified liquid seasoning had a total light transmittance of 3.3% and a viscosity of 0.8 Pa·s. Here, the weight ratio of the egg yolk content in terms of the raw egg yolk and the gum substance content was 1:2, and the total content of the egg yolk in terms of the raw egg yolk and the gum substance was 2 parts with respect to 100 parts of the edible oil.

After storage at room temperature (20° C.) for 2 weeks and 2 months, each of the thus obtained packaged sesame-containing acidic emulsified liquid seasoning was tasted. As a result, in either case, the roasted sesame flavor was very strong and preferable, and it was refreshing and delicious with distinctive flavor of sesame.

| <Blending ratio of the sesame-containing acidic emulsified liquid seasoning> | |
|---|---|
| Salad oil | 35% |
| Soy sauce | 7% |
| Vinegar (acidity 4%) | 15% |
| Sugar | 10% |
| Lyso-treated egg yolk | 0.2% |
| Guar gum | 0.2% |
| Xanthan gum | 0.2% |
| Ground roasted sesame | 5% |
| Pure water | remaining amount |
| Total | 100% |

Example 3

The packaged sesame-containing acidic emulsified liquid seasoning according to the present invention was produced in the same manner as in Example 1, except that the blending ratio was changed to the one listed below. It is noted here that the ground roasted sesame used in this example was the same as the one used in Example 1. Further, the results of measuring the size of the roasted sesame dispersed in the thus obtained sesame-containing acidic emulsified liquid seasoning were almost identical to those obtained in Example 1.

The thus obtained sesame-containing acidic emulsified liquid seasoning had a total light transmittance of 7.5% and a viscosity of 3 Pa·s. Here, the weight ratio of the egg yolk content in terms of the raw egg yolk and the gum substance content was 1:6, and the total content of the egg yolk in terms of the raw egg yolk and the gum substance was 5 parts with respect to 100 parts of the edible oil.

After storage at room temperature (20° C.) for 2 weeks and 2 months, each of the thus obtained packaged sesame-containing acidic emulsified liquid seasoning was tasted. As a result, in either case, the roasted sesame flavor was very strong and preferable, and it was refreshing and delicious with distinctive flavor of sesame.

<Blending ratio of the sesame-containing acidic emulsified liquid seasoning>

| | |
|---|---|
| Salad oil | 15% |
| Soy sauce | 5% |
| Salt | 1% |
| Vinegar (acidity 4%) | 15% |
| Sugar | 10% |
| Raw egg yolk | 0.05% |
| Lyso-treated egg yolk | 0.05% |
| Tamarind gum | 0.3% |
| Xanthan gum | 0.3% |
| Ground roasted sesame | 5% |
| Pure water | remaining amount |
| Total | 100% |

Example 4

The packaged sesame-containing acidic emulsified liquid seasoning according to the present invention was produced in the same manner as in Example 1, except that lyso-treated egg yolk was not blended and the amount of raw egg yolk was increased to 0.2%. Here, the thus obtained sesame-containing acidic emulsified liquid seasoning had almost the same total light transmittance and viscosity as the one obtained in Example 1. Further, the results of measuring the size of the roasted sesame dispersed in the thus obtained sesame-containing acidic emulsified liquid seasoning were almost identical to those obtained in Example 1.

After storage at room temperature (20° C.) for 2 weeks and 2 months, each of the thus obtained packaged sesame-containing acidic emulsified liquid seasoning was tasted. As a result, in either case, the roasted sesame flavor was very strong and preferable, and it was refreshing and delicious with distinctive flavor of sesame.

Test Example 1

In order to examine the effects of the egg yolk content and the grinding degree of the roasted sesame on the total light transmittance of the sesame-containing acidic emulsified liquid seasoning and the strength of the roasted sesame flavor after storage, the following test was carried out. That is, 7 types of packaged emulsified liquid seasoning each having a different egg yolk content and size of the roasted sesame were produced in the same manner as in Example 1, except that the egg yolk content and the size of the roasted sesame were changed as shown in Table 1. In this case, the egg yolk content was increased or decreased while maintaining the content ratio of the raw egg yolk and lyso-treated egg yolk at 1:1. Then, after storing the thus obtained 7 types of packaged emulsified liquid seasoning at room temperature (20° C.) for 2 months, the strength of the roasted sesame flavor of each type was evaluated based on the evaluation criteria described below. The evaluation results are shown in Table 1. Here, there was almost no difference between the total light transmittance of respective emulsified liquid seasoning measured immediately after the production and that measured after the product storage. The total light transmittance of respective emulsified liquid seasoning is shown in Table 1. In addition, there was also almost no difference in the viscosities of respective emulsified liquid seasoning before and after the storage and they were all almost the same as that of the emulsified liquid seasoning produced in Example 1.

<Evaluation Criteria for the Strength of the Roasted Sesame Flavor>

A: very strong
B: strong
C: slightly weak
D: weak

TABLE 1

| | | Roasted sesame | | Sesame-containing acidic emulsified liquid seasoning | |
|---|---|---|---|---|---|
| | Egg yolk content (%) | Content of the roasted sesame passing through the 14-meth (%) | Content of the roasted sesame remaining on the 32-mesh (%) | Total light transmittance (%) | Strength of the roasted sesame flavor |
| Test sample 1-1 | 0.2 | 93 | 76 | 3.1 | A |
| Test sample 1-2 | 0.4 | 93 | 76 | 2.3 | A |
| Test sample 1-3 | 0.4 | 97 | 38 | 1.8 | B |
| Test sample 1-4 | 0.7 | 93 | 76 | 1.9 | B |
| Test sample 1-5 | 0.7 | 97 | 38 | 1.6 | B |
| Test sample 1-6 | 1.8 | 93 | 76 | 1.1 | C |
| Test sample 1-7 | 5 | 93 | 76 | 0.6 | D |

From Table 1, it is understood that those sesame-containing acidic emulsified liquid seasoning (test samples 1-1 to 1-5) having a total light transmittance of 1.5 to 10%, which was determined by measuring the turbidity using integrating sphere-type electrophotometry, had a strong and preferable roasted sesame flavor after the storage. Particularly, in those cases where the total light transmittance was 2.0 to 10% (test samples 1-1 and 1-2), the roasted sesame flavor after the storage was very strong and more preferable. In contrast, in those cases where the total light transmittance was lower than the above-described range (test samples 1-6 and 1-7), the roasted sesame flavor after the storage was weak and not preferable.

Further, with regard to the effect of the grinding degree of the roasted sesame on the total light transmittance of the sesame-containing acidic emulsified liquid seasoning, from the comparison between the test samples 1-2 and 1-3 having a different size of the roasted sesame, it is understood that the measured total light transmittance of the test sample 1-2 having a large-sized roasted sesame is greatly different from that of the test sample 1-3 having a small-sized roasted sesame. In addition, the test sample 1-2 having a large-sized roasted sesame and a measured total light transmittance of not lower than 2.0% had a very strong and more preferable roasted sesame flavor after the storage.

Meanwhile, with regard to the effect of the egg yolk content on the total light transmittance of the sesame-containing acidic emulsified liquid seasoning, from the comparisons of the test samples 1-1, 1-2, 1-4, 1-6 and 1-7, each of which has a different egg yolk content, it is understood that the smaller the egg yolk content is, the larger the measured total light transmittance becomes. Here, in the test samples 1-1, 1-2 and 1-4 where the content of the egg yolk in the product was 0.01 to 0.7% in terms of the raw egg yolk, a total light transmittance was not lower than 1.5% and the roasted sesame flavor after the storage was strong and preferable. Particularly, in the test samples 1-1 and 1-2 where the content of the egg yolk in the product was 0.01 to 0.4% in terms of the raw egg yolk and the total light transmittance was not lower than 2.0%, the roasted sesame flavor after the storage was very strong and more preferable.

Test Example 2

In order to examine the effect of difference in the thickener on the strength of the roasted sesame flavor of the sesame-containing acidic emulsified liquid seasoning after storage, the following test was carried out. That is, 4 types of packaged sesame-containing acidic emulsified liquid seasoning each containing a different thickener were produced in the same manner as in Example 1, except that the thickener was changed as shown in Table 2. Then, after storing the thus obtained 4 types of packaged emulsified liquid seasoning at room temperature (20° C.) for 2 months, the strength of the roasted sesame flavor of each type was evaluated based on the same evaluation criteria as in Test Example 1. The evaluation results are shown in Table 2. Here, there was almost no difference between the viscosity of respective emulsified liquid seasoning measured immediately after the production and that measured after the product storage. The viscosity of respective emulsified liquid seasoning is shown in Table 2. In addition, there was also almost no difference in the total light transmittances of respective emulsified liquid seasoning before and after the storage they were all almost the same as that of the emulsified liquid seasoning produced in Example 1.

TABLE 2

| | Thickener | | Sesame-containing acidic emulsified liquid seasoning | |
|---|---|---|---|---|
| | Type | Content (%) | Viscosity (Pa · s) | Strength of the roasted sesame flavor |
| Test sample 2-1 | Guar gum | 0.4 | 0.5 | A |
| Test sample 2-2 | Xanthan gum | 0.2 | 0.5 | A |
| Test sample 2-3 | Tamarind seed gum | 0.3 | 0.6 | A |
| Test sample 2-4 | Pregelatinized starch | 1 | 0.5 | C |

From Table 2, it is understood that those sesame-containing acidic emulsified liquid seasoning (test samples 2-1 to 2-3) in which a gum substance was used as the thickener had a strong and preferable roasted sesame flavor after the storage. In contrast, in the case where pregelatinized starch was used as the thickener (test sample 2-4), the roasted sesame flavor after the storage was weak.

Comparative Example 1

Packaged sesame-containing acidic emulsified liquid seasoning was produced in the same manner as in Example 3, except that the amount of tamarind gum was increased to 1%. The thus obtained sesame-containing acidic emulsified liquid seasoning had a viscosity of 6 Pa·s, and when it was tasted after storage at room temperature (20° C.) for 2 months, the roasted sesame flavor was weak and not preferable.

Comparative Example 2

Packaged sesame-containing acidic emulsified liquid seasoning was produced in the same manner as in Example 3, except that the tamarind gum and xanthan gum were not blended. When the thus obtained sesame-containing acidic emulsified liquid seasoning was stored at room temperature (20° C.) for 2 months, the separation of the contents was severe and the roasted sesame flavor was weak and not preferable.

Comparative Example 3

Packaged sesame-containing acidic emulsified liquid seasoning was produced in the same manner as in Example 1, except that unground roasted sesame was blended in place of the ground roasted sesame. In the thus obtained sesame-containing acidic emulsified liquid seasoning, most of the roasted sesame dispersed therein remained unground without being ground. When this sesame-containing acidic emulsified liquid seasoning was tasted after storage at room temperature (20° C.) for 2 months, the roasted sesame flavor was weak and not preferable.

Comparative Example 4

Packaged sesame-containing acidic emulsified liquid seasoning was produced in the same manner as in Example 1, except that a sesame paste (in which the content of the roasted sesame passing through a 14-mesh is 100% and that of the roasted sesame remaining on a 32-mesh is 0%) was blended as ground roasted sesame. When the thus obtained sesame-containing acidic emulsified liquid seasoning was tasted after storage at room temperature (20° C.) for 2 months, the roasted sesame flavor was weak and not preferable.

The invention claimed is:

1. A sesame-containing acidic emulsified liquid seasoning, characterized by comprising ground roasted sesame, gum substance, egg yolk and edible oil and having a viscosity of 0.1 to 3 Pa·s and a total light transmittance of 1.5 to 10%, a content of said roasted sesame in the seasoning being not less than 3% and not more than 35%, a content of said roasted sesame passing through a 14-mesh (Tyler standard) of not less than 50% and a content of said roasted sesame remaining on a 32-mesh (Tyler standard) of not less than 30%, with respect to the total amount of said roasted sesame contained in said seasoning, a content of the edible oil in the seasoning not being less than 5%, the total amount of the egg yolk in terms of raw egg yolk and gum substance in the seasoning being 0.1 to 5 parts with respect to 100 parts of the edible oil, said gum substance comprising xanthan gum, said total light transmittance being determined by measuring the turbidity of said sesame-containing acidic emulsified liquid seasoning using integrating sphere-type electrophotometry in accordance with the following procedure:

Procedure: said sesame-containing acidic emulsified liquid seasoning is poured into a 32-mesh sieve (Tyler standard) and allowed to free-fall therethrough, and said sesame-containing acidic emulsified liquid seasoning that passed through said sieve is then placed in a 5 mm-thick quartz cell to measure the total light transmittance thereof, taking pure water as a control.

2. The sesame-containing acidic emulsified liquid seasoning according to claim 1, which has a content of said egg yolk in the seasoning of 0.01 to 0.4% in terms of raw egg yolk.

3. The sesame-containing acidic emulsified liquid seasoning according to claim 1, wherein said egg yolk is lyso-treated egg yolk.

4. The sesame-containing acidic emulsified liquid seasoning according to claim 2, wherein said egg yolk is lyso-treated egg yolk.

5. The sesame-containing acidic emulsified liquid seasoning according to claim 1, wherein said content of the edible oil in the seasoning is 5 to 35%.

6. The sesame-containing acidic emulsified liquid seasoning according to claim 2, wherein not less than 30% of the egg yolk is a lyso-treated egg yolk.

7. The sesame-containing acidic emulsified liquid seasoning according to claim 3, wherein a content of said lyso-treated egg yolk in the seasoning is 0.01 to 0.4% in terms of raw egg yolk.

8. The sesame-containing acidic emulsified liquid seasoning according to claim 3, wherein a lyso-ratio of said lyso-treated egg yolk is 10 to 80% when analyzed by the Iatroscan method (TLF-FID method).

9. The sesame-containing acidic emulsified liquid seasoning according to claim 1, wherein a weight ratio of said egg yolk content in terms of raw egg yolk and said gum substance content is 5 to 95:95 to 5.

10. The sesame-containing acidic emulsified liquid seasoning according to claim 1, further comprising acidulants.

11. The sesame-containing acidic emulsified liquid seasoning according to claim 10, wherein said acidulants are selected from the group consisting of vinegar, citric acid, citrus juices and mixtures thereof.

* * * * *